US012798171B2

(12) United States Patent
Baldisserri et al.

(10) Patent No.: US 12,798,171 B2
(45) Date of Patent: Nov. 17, 2026

(54) MALE ELEMENT OF A MOULD

(71) Applicant: SACMI COOPERATIVA MECCANICI IMOLA SOCIETA' COOPERATIVA, Imola (IT)

(72) Inventors: Davide Baldisserri, Imola (IT); Stefano Bergami, Castel San Pietro Terme (IT); Marcello Zama, Faenza (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 133 days.

(21) Appl. No.: 18/251,634

(22) PCT Filed: Nov. 9, 2021

(86) PCT No.: PCT/IB2021/060348

§ 371 (c)(1),
(2) Date: May 3, 2023

(87) PCT Pub. No.: WO2022/101770

PCT Pub. Date: May 19, 2022

(65) Prior Publication Data

US 2023/0405909 A1 Dec. 21, 2023

(30) Foreign Application Priority Data

Nov. 10, 2020 (IT) ........................ 102020000026855

(51) Int. Cl.
*B29C 49/02* (2006.01)
*B29C 43/36* (2006.01)
(Continued)

(52) U.S. Cl.
CPC .......... *B29C 49/0685* (2022.05); *B29C 43/36* (2013.01); *B29C 43/52* (2013.01);
(Continued)

(58) Field of Classification Search
CPC ......... B29C 49/02; B29C 43/36; B29C 43/52; B29C 49/12; B29C 49/64; B29C 49/6427
See application file for complete search history.

(56) References Cited

U.S. PATENT DOCUMENTS 3,280,236 A 10/1966 Ninneman et al.
4,070,141 A 1/1978 Ryder
(Continued)

FOREIGN PATENT DOCUMENTS

CH 431030 A 2/1967
CN 202895672 U 4/2013
(Continued)

OTHER PUBLICATIONS

Notice of Reasons for refusal issued in Japanese Patent Application No. 2023-527664, dated Aug. 6, 2024, with English Translation.
(Continued)

*Primary Examiner* — Alison L Hindenlang
*Assistant Examiner* — Shibin Liang
(74) *Attorney, Agent, or Firm* — United IP Counselors, LLC

(57) ABSTRACT

A male element (100) of a mould (10) for the compression moulding of a parison comprises: a die (110), extending along a longitudinal axis (A) and including a body (112) having, inside it, a longitudinal cavity (113) extending along the longitudinal axis (A) and, at one end of it, a socket (111) in communication with the longitudinal cavity (113); a stretching rod (120), slidably inserted in the longitudinal cavity (113) and including a terminal portion (121) at one end of it, the stretching rod (120) being movable relative to the die (110) between a retracted position, in which the terminal portion (121) is housed inside the socket (111), and an extracted position, in which the terminal portion (121) is extracted from the socket (111).

16 Claims, 6 Drawing Sheets

(51) Int. Cl.

| | |
|---|---|
| ***B29C 43/52*** | (2006.01) |
| ***B29C 49/12*** | (2006.01) |
| ***B29C 49/64*** | (2006.01) |

(52) U.S. Cl.

CPC .......... *B29C 49/12* (2013.01); *B29C 49/6427* (2013.01); *B29C 49/6465* (2022.05)

(56) References Cited

U.S. PATENT DOCUMENTS

| | | | | |
|---|---|---|---|---|
| 4,150,689 | A * | 4/1979 | Britten ...................... F16K 1/44 | 425/535 |
| 4,473,515 | A * | 9/1984 | Ryder ................. B29C 45/7337 | 425/530 |
| 5,213,752 | A | 5/1993 | Miyazawa et al. | |
| 8,790,112 | B2 | 7/2014 | Albrecht | |
| 10,781,010 | B2 | 9/2020 | Fukushima et al. | |
| 2012/0100241 | A1* | 4/2012 | Parrinello ............... B29C 43/34 | 425/525 |
| 2016/0200028 | A1 | 7/2016 | Lewin et al. | |

FOREIGN PATENT DOCUMENTS

| | | | |
|---|---|---|---|
| CN | 105517772 | A | 4/2016 |
| CN | 108284566 | A | 7/2018 |
| DE | 102012000626 | A1 | 7/2013 |
| JP | S61148020 | A | 7/1986 |
| JP | 2005288482 | A | 10/2005 |
| JP | 2015516894 | A | 6/2015 |
| WO | 2007107822 | A2 | 9/2007 |
| WO | 2008110887 | A2 | 9/2008 |
| WO | 2013140351 | A1 | 9/2013 |

OTHER PUBLICATIONS

International Search Report and Written Opinion for PCT/IB2021/060348, mailed Jan. 27, 2022.

Office Action and Search Report issued in corresponding Taiwanese Patent Application No. 110141702, dated Mar. 5, 2025.

Intellectual Property India First Examination Report for Application No. 202317027452; Apr. 16, 2026; 4 Pages.

* cited by examiner

MALE ELEMENT OF A MOULD

TECHNICAL FIELD

This invention relates to a male element of a mould, a mould, a forming and blow moulding machine and a method for the compression moulding and blow moulding of a parison.

BACKGROUND ART

Known in the prior art are machines configured to form a parison by moulding and to blow mould the parison to obtain a container. More specifically, known from patent documents WO2008/110887A2 and WO2007107822A2, in the name of the present Applicant, is a machine which is configured to form the parison by compression moulding and to blow mould it; the machine comprises a plurality of moulds; each mould comprises a male element and a female element, configured to form the parison by compression moulding; after moulding, the female element is moved away from the male element and the parison remains hanging from the male element; next, the parison is stretched with a stretching rod, which is extractable from the male element, and then blow moulded into a blow moulding cavity to obtain the container.

Patent document U.S. Ser. No. 10/781,010B2 also discloses a machine which is configured to form a parison by compression moulding and to blow mould it. Patent document U.S. Pat. No. 8,790,112B2 discloses a machine which is configured to form a parison by injection moulding and to blow mould it. Prior art forming and blow moulding machines have several disadvantages. First of all, just after being formed by moulding, the parison is very hot and mist be cooled before it can be blow moulded; cooling must be as uniform as possible to ensure the container is of good quality, and must be fast to reduce the cycle time; this cooling need is felt in particular when moulding is done by compression.

Also, in prior art moulds, the air for blow moulding is blown through a channel made in the stretching rod; this solution involves making the stretching rod relatively thick and, generally speaking, a complex design. Further, when the female half mould is moved away from the male half mould after forming, the parison may, in some cases, not remain properly attached to the male half mould, leading to surface defects on the parison, hence on the container.

Moreover, there may also be problems caused by the stretching rod breaking during its extracting and/or retracting movement.

Other examples of machines configured to form a parison by compression moulding and to blow mould it are provided by patent documents CH431030A, US2012100241A1, U.S. Pat. Nos. 4,150,689A, and 4,473,515A; however, those documents fail to disclose a solution able to satisfy the market's requirements.

DISCLOSURE OF THE INVENTION

The aim of this disclosure is to provide a male element of a mould, a mould, a forming and blow moulding machine and a method for the compression moulding and blow moulding of a parison to overcome the above mentioned disadvantages of the prior art.

This aim is fully achieved by the male element, the mould, the machine and the method of this disclosure as characterized in the appended claims.

This disclosure relates to a male element of a mould. The mould is configured to form a parison. Preferably, the mould is configured for compression moulding the parison from a previously prepared dose of thermoplastic material; nevertheless, this disclosure might also be applicable to a male element and an injection mould or an injection-compression mould.

The male element is associable with a female element of the mould to delimit a forming cavity in which the parison is formed. For example, the male element may define an upper half mould and the female element may define a lower half mould (or vice versa), movable towards and away from each other between an open position, in which they receive the dose of thermoplastic material, and a closed position, in which they delimit the forming cavity to mould the dose of material to form the parison. Preferably, the dose is received by the lower half mould. For example, the dose may be propelled onto the lower half mould by a dose propelling machine.

The male element comprises a die. The die extends along a longitudinal axis. The die includes a body having, inside it, a longitudinal cavity which extends along the longitudinal axis. One end of the body (that is, of the die) is provided with a socket which is in communication with the longitudinal cavity. By socket is meant a recessed or hollow zone formed within an outside surface of the die.

The male element comprises a stretching rod. The stretching rod is slidably inserted in the longitudinal cavity. At one end of it, the stretching rod includes a terminal portion. The stretching rod also comprises an elongate body, extending along the longitudinal axis and connected to the terminal portion. Preferably, the longitudinal cross section of the terminal portion is larger than the longitudinal cross section of the elongate body of the stretching rod. The stretching rod is movable (slidable) relative to the die between a retracted position and an extracted position. At the retracted position, the terminal portion is housed inside the socket; thus, together with the die, the terminal portion contributes to delimiting the forming cavity. At the retracted position, the elongate body of the stretching rod is housed inside the longitudinal cavity. At the extracted position, the terminal portion is extracted from the socket so it stretches the parison. At the extracted position, the elongate body of the stretching rod is housed partly inside the longitudinal cavity and partly outside of it.

The male element comprises a passage for an air flow to blow mould the parison to form a container.

It should be noted that during stretching and blow moulding, the male element is associated with a blow moulding cavity which is substituted for the female element. The blow moulding cavity has the shape of the container to be made.

Preferably, internally, the die includes a cooling circuit configured to allow a flow of a cooling fluid. The cooling fluid may be water, for example.

In an example, the passage for an air flow is formed by a portion of the longitudinal cavity. In an example, the passage for the air flow is formed by a portion of the longitudinal cavity, between an outside surface of the stretching rod and an inside surface of the body delimiting the longitudinal cavity. As a possible alternative, the passage for the air flow may be formed inside the stretching rod.

The passage for the air flow may include a gap formed by a portion of the longitudinal cavity. Preferably, the passage for the air flow includes a gap formed by a portion of the longitudinal cavity, between an outside surface of the stretching rod and an inside surface of the die delimiting the longitudinal cavity.

In an example, the passage for the air flow includes a gap formed by a portion of the longitudinal cavity, between an outside surface of the stretching rod and an inside surface of the body delimiting the longitudinal cavity.

In effect, the stretching rod is at least partly spaced from the inside wall of the die body defining the longitudinal cavity, so the gap configured to allow the passage of the air flow is defined between the stretching rod and the inside wall of the die body. The gap runs along the longitudinal axis. It should be noted that the gap extends up to the socket, where there is an outlet to allow the air flow to exit. Preferably, at the retracted position, the terminal portion of the stretching rod occludes the outlet to prevent the air from flowing from the gap to the forming cavity; at the extracted position, on the other hand, the terminal portion is spaced from the socket, so the outlet is open and allows the air to flow out of the gap.

Preferably, the gap has an (at least partly) tubular shape, surrounding the stretching rod; the outlet is annular in shape.

Preferably, the male element comprises an actuating unit configured to drive a movement of the stretching rod from the extracted position to the retracted position and vice versa. In an embodiment, the male element also comprises a damping device, configured to slow the movement of the stretching rod from the extracted position to the retracted position. The damping device is associated with the actuating unit. More specifically, the damping device is configured to slow the stretching rod at the end of its movement from the extracted position to the retracted position; in effect, if the stretching rod were to reach the end of its stroke at too high a speed, the impact would damage it.

In an embodiment, the male element comprises a diffuser rod, extending between a first end, connected to the stretching rod, and a second end, opposite to the first end. In an embodiment, the first end of the diffuser rod is connected to the stretching rod by a threaded connection; more specifically, the first end of the diffuser rod defines a threaded cavity to which a threaded end of the stretching rod is screwed. The actuator unit is connected to the second end of the diffuser rod and is configured to move the diffuser rod between a first position, corresponding to the extracted position of the stretching rod, and a second position, corresponding to the retracted position of the stretching rod. Thus, the actuating unit moves the diffuser rod, which in turn moves the stretching rod. Preferably, the damping device is mounted at the second end of the diffuser rod (that is, in a connection zone between the diffuser rod and the actuating unit) and is configured to slow the movement of the diffuser rod from the first to the second position. The damping device is preferably configured to slow the diffuser rod at the end of its movement from the first to the second position. This avoids breaking the stretching rod and/or the threaded connection between the stretching rod and the diffuser rod. More specifically, the damping device may include a spring that is mounted to the second end of the diffuser rod.

It should be noted that in an embodiment, the male element might not include the stretching rod or the longitudinal cavity in which the stretching rod slides. In effect, in this embodiment, the die is retractile relative to an upper part of the male element so it can move between a retracted position where, together with the upper part, it contributes to delimiting the forming cavity, and an extracted position, where it is configured to stretch the parison, in the same way as described in patent document U.S. Ser. No. 10/781,010B2. In this embodiment, the air passage is formed inside the die. The cooling circuit is also formed inside the die.

The cooling circuit includes at least one delivery duct for circulating the cooling fluid towards the end of the die and at least one return duct for circulating the cooling fluid returning from the end of the die. The return duct is connected to the delivery duct in series.

In an embodiment, the delivery duct and/or the return duct are coil shaped that is, they are configured to guide the cooling fluid through a plurality of passages or coils. More specifically, the delivery duct and/or the return duct may be helically shaped; in an embodiment, the delivery duct and/or the return duct may be helically shaped, each having the shape of a double helix. In an embodiment, the delivery duct has the shape of a first helix wound around the longitudinal axis and the return duct has the shape of a second helix wound around the longitudinal axis; more specifically, at least one coil of the first helix is interposed, along the longitudinal axis, between a first and a second coil of the second helix.

In an example, the passage for an air flow is separated with respect to the cooling circuit. Preferably, the passage for the air flow and the cooling circuit define separated conduits.

In an example, the body has an external surface, opposite to the internal surface, i.e. opposite to the surface that defines at least partially the longitudinal cavity. Preferably, the cooling circuit is at least in contact with the external surface of the body.

In fact, while the cooling circuit is in contact with the external surface of the body, the passage for the air flow (or the gap) is in contact with the internal surface of the body so that the cooling circuit and the passage for the air flow define separated conduits.

In an embodiment, the die comprises a liner fitted round the body and the cooling circuit is formed between the body and the liner; more specifically, an outside surface of the body facing towards the liner is grooved in such a way as to create a hollow surface acting in conjunction with a corresponding portion of an inside surface of the liner to delimit ducts for the cooling fluid. Preferably, the outside surface of the body also has contact or support zones where it is in contact with the liner. Thanks to the structure defined by the grooved body and the liner fitted round and supported by the body, it is possible for the liner to be made relatively thin, hence having low thermal resistance, thereby obtaining good cooling efficiency.

Preferably, the male element comprises an abutment element configured to come into abutment against an annular periphery of the female element, a support element and an elastic element, connected between the abutment element and the support element. The support element is connected to the die; preferably, the die is movable relative to the support element. The abutment element is movable relative to the support element between a rest position, where the elastic element keeps it spaced from the support element, and a working position, where it is in contact with the support element. The abutment element can be set to the working position by the effect of pressure applied thereon by the female element; more specifically, the female element applies the pressure on the abutment element when the mould is in a closed configuration, where the male element and the female element are close together to delimit the forming cavity. At the working position, the elastic element is compressed and the abutment element is close to the support element. The elastic element ensures that the female element goes well into contact with the male element, even in the presence of minor imprecisions of the actuating units that close the mould.

Preferably, the mould also comprises a locking device, configured to engage the abutment element to keep it at the working position even when the female element no longer applies pressure on it. In effect, in the absence of the pressure applied by the female element and in the absence of the locking device, the abutment element would, under the action of the elastic element, tend to settle at a rest position where it is spaced from the support element. The locking device can be positioned at a locking position where it locks the abutment element at the working position; the locking device can also be positioned at a rest position where it does not interfere with the abutment element and allows it to be positioned at the respective rest position, spaced from the support element. While the mould is being closed, the locking device is at the rest position and the abutment element is moved to the working position by the effect of the pressure applied thereon by the female element; when the mould is closed, the locking device is activated and positioned at the respective working position, where it engages the abutment element. Then, when the mould is opened (that is, when the female element is detached and spaced from the male element), the abutment element remains at the working position, thanks to the locking device. This prevents unwanted movement of the abutment element from the working position to the rest position when the parison has just been formed and is hanging from the die; this unwanted movement would tend to pull the parison away from the die, causing the parison to be detached from the die and/or leading to surface defects of the parison, which are thus prevented or at least reduced.

This disclosure also provides a mould; the mould is configured for forming and blow moulding a parison. Preferably, the mould is configured for compression moulding the parison from a dose of thermoplastic material.

The mould might, however, be configured for injection moulding or injection-compression moulding the parison.

The mould comprises a male element according to one or more aspects of this disclosure. The mould comprises a female element which is associable with the male element to delimit the forming cavity that forms the parison. The mould also comprises a blow moulding cavity, associable with the male element instead of the female element to delimit a blow moulding cavity intended for the forming of a container from the parison.

The mould has (that is, is operable in) a forming configuration in which the male element is associated with the female element. In the forming configuration, the blow moulding cavity is spaced from the male element. In the embodiment in which there is a stretching rod which is movable relative to the die, the stretching rod, in the forming configuration, is at the retracted position. In the embodiment in which the die is movable relative to the upper part of the male element, the die, in the forming configuration, is close to the upper part.

The mould has (that is, is operable in) a stretching and blow moulding configuration in which the male element is associated with the blow moulding cavity. In the stretching and blow moulding configuration, the female element is spaced from the male element. In the embodiment in which there is a stretching rod which is movable relative to the die, the stretching rod, in the stretching and blow moulding configuration, is at the extracted position. In the embodiment in which the die is movable relative to the upper part of the male element, the die, in the stretching and blow moulding configuration, is extracted—that is, spaced from—the upper part.

The mould also has a dose receiving configuration, in which the female element is spaced from the male element to receive the dose. Preferably, the mould receives the dose from a dose inserting device which inserts the dose into the cavity of the female element; preferably, the dose inserting device propels the dose into the cavity of the female element.

Preferably, the die of the male element is positioned at the same vertical height in the forming configuration as it is in the stretching and blow moulding configuration; the stretching rod, on the other hand, is extracted for stretching and then moved down. Thus, the parison does not perform any downward movement after being formed and before being stretched (in effect, the parison remains attached to the die).

This disclosure also provides a forming and blow moulding machine comprising a plurality of moulds according to one or more aspects of this disclosure. The machine preferably comprises a rotary carousel, where the plurality of moulds are positioned, preferably equispaced, at the circular periphery of the rotary carousel.

This disclosure also provides a method for the forming and blow moulding of a parison. Preferably, the parison is formed by compression moulding; thus, the method preferably comprises a step of receiving a previously prepared dose of thermoplastic material in a mould and a step of forming the parison from the dose. In other embodiments, the parison might be formed by injection moulding or injection-compression moulding.

The parison is formed in a forming cavity delimited by a male element and a female element of the mould. The male element comprises a die, extending along a longitudinal axis and includes a body; preferably, inside it, the body has a longitudinal cavity extending along the longitudinal axis and, at one end of it, a socket which is in communication with the longitudinal cavity.

Preferably, the method comprises a step of stretching and blow moulding the parison to form a container, in which blow moulding includes blowing an air flow into a passage of the male element.

Preferably, the male element also comprises a stretching rod which is slidably inserted in the longitudinal cavity and which, at one end of it, includes a terminal portion; where the stretching rod is movable—that is, slidable—relative to the die. In the step of forming, the stretching rod is at a retracted position, where the terminal portion is housed inside the socket to contribute, together with the die, to delimiting the forming cavity; in the step of stretching, the stretching rod is at an extracted position, where the terminal portion is extracted from the socket so it stretches the parison. Thus, the method comprises moving the stretching rod from the retracted position to the extracted position.

Preferably, the method comprises a step of cooling the die by passing a cooling fluid through a cooling circuit inside the die.

In an embodiment, the method also comprises a step of slowing the movement of the stretching rod from the extracted position to the retracted position with a damping device.

In an embodiment, the male element comprises an abutment element configured to come into abutment against an annular periphery of the female element, a support element and an elastic element, connected between the abutment element and the support element; in this embodiment, the method comprises a step of moving the abutment element relative to the support element between a rest position, where the elastic element keeps it spaced from the support element, and a working position, where it is in contact with the support element; the abutment element is set at the working position by the effect of pressure applied thereon by the female element while the mould is being closed. In this embodiment, the method may also include locking the abutment element at the working position with a locking device which engages the abutment element so that while the mould is being opened, the abutment element remains at the working position even if the female element is not applying pressure on it. The locking device is thus disengaged from the abutment element after the steps of stretching and blow moulding.

BRIEF DESCRIPTION OF DRAWINGS

These and other features will become more apparent from the following description of a preferred embodiment, illustrated by way of non-limiting example in the accompanying drawings, in which.

DETAILED DESCRIPTION OF PREFERRED EMBODIMENTS OF THE INVENTION

Figure 1:
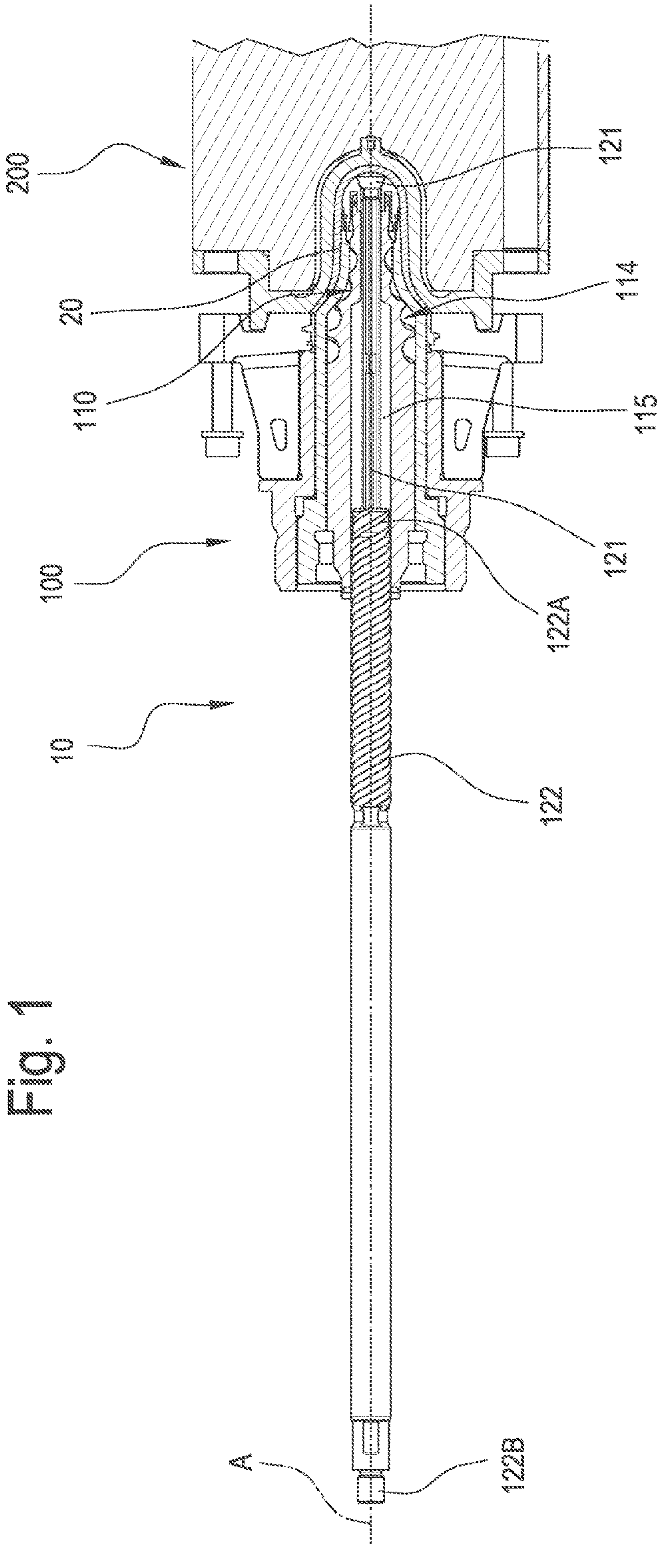
FIG. 1 illustrates a mould according to one or more aspects of this disclosure.
Figure 2:
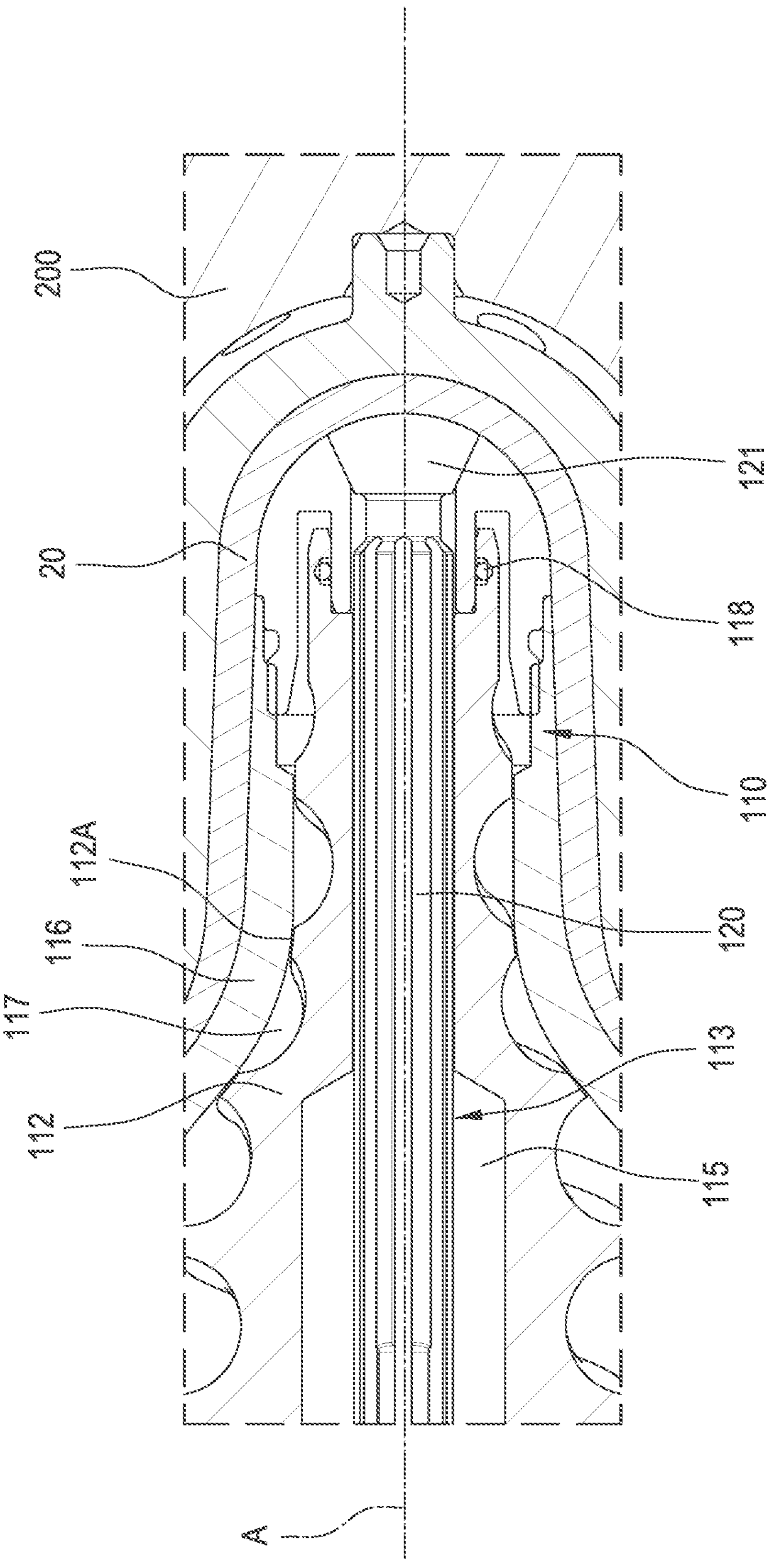
FIG. 2 illustrates a detail of the mould of FIG. 1.
Figure 3B:
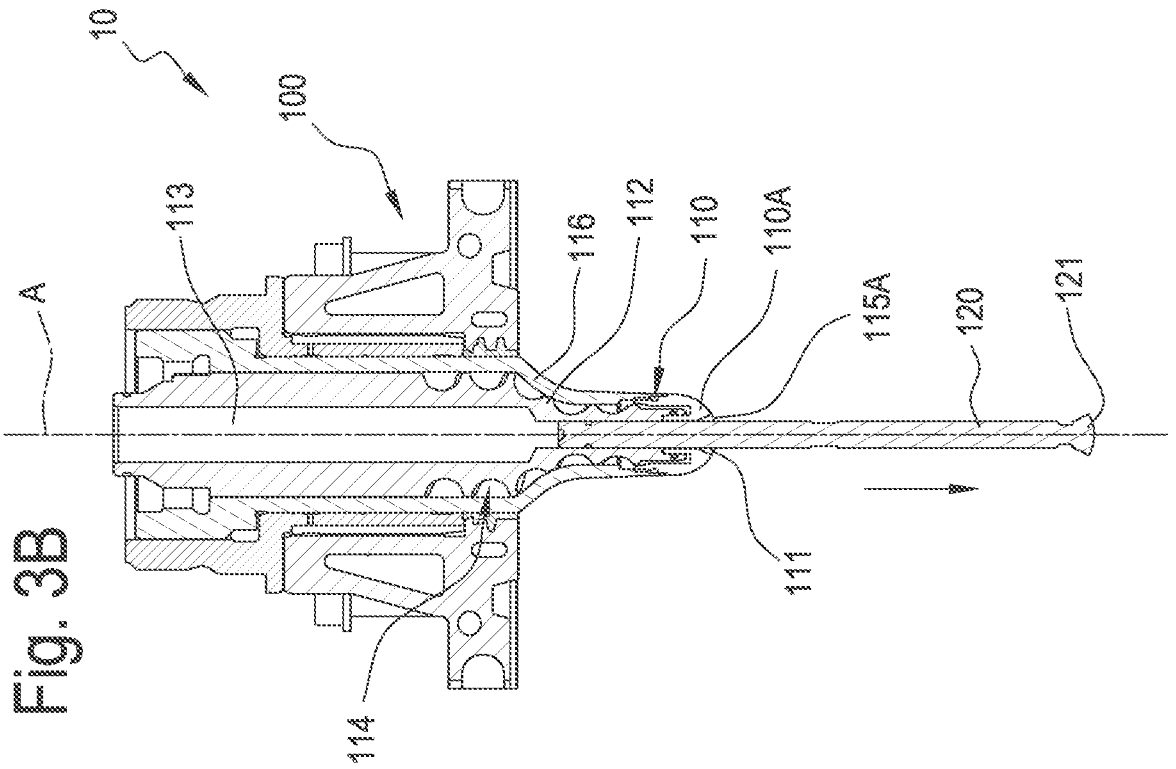
FIG. 3B illustrates the male element of the mould of FIG. 1 with the stretching rod at the extracted position.
Figure 3A:
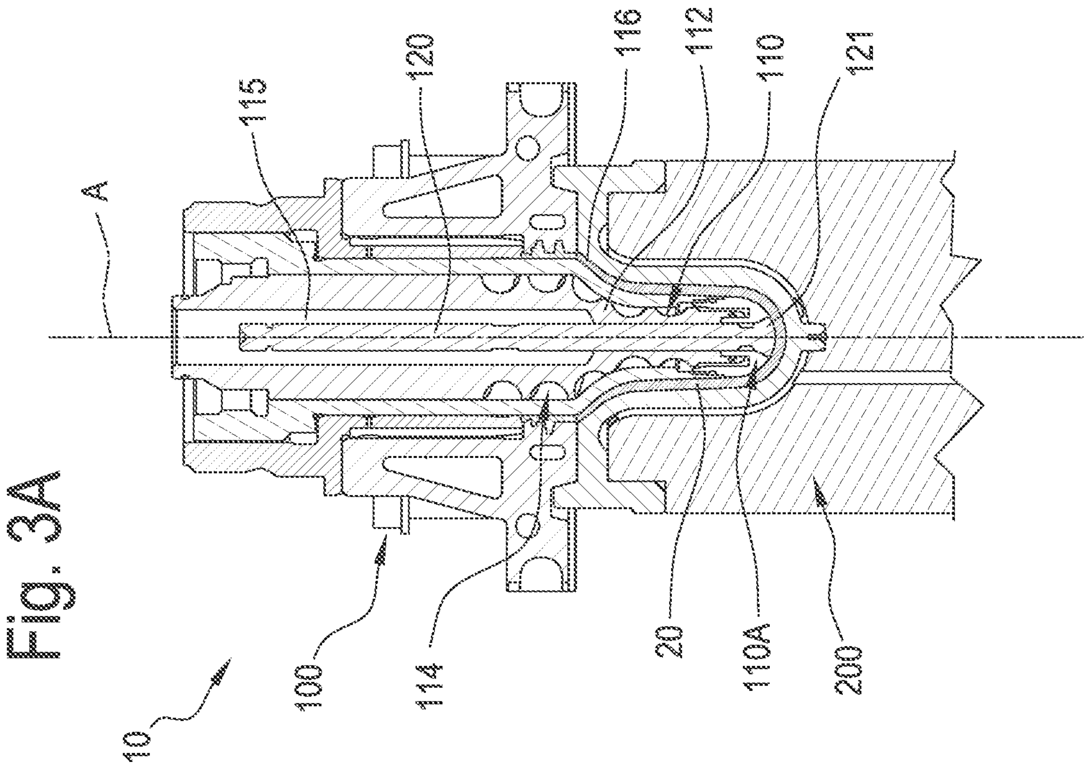
FIG. 3A illustrates a detail of the mould of FIG. 1 in the forming configuration and with the stretching rod at the retracted position.
Figure 4:
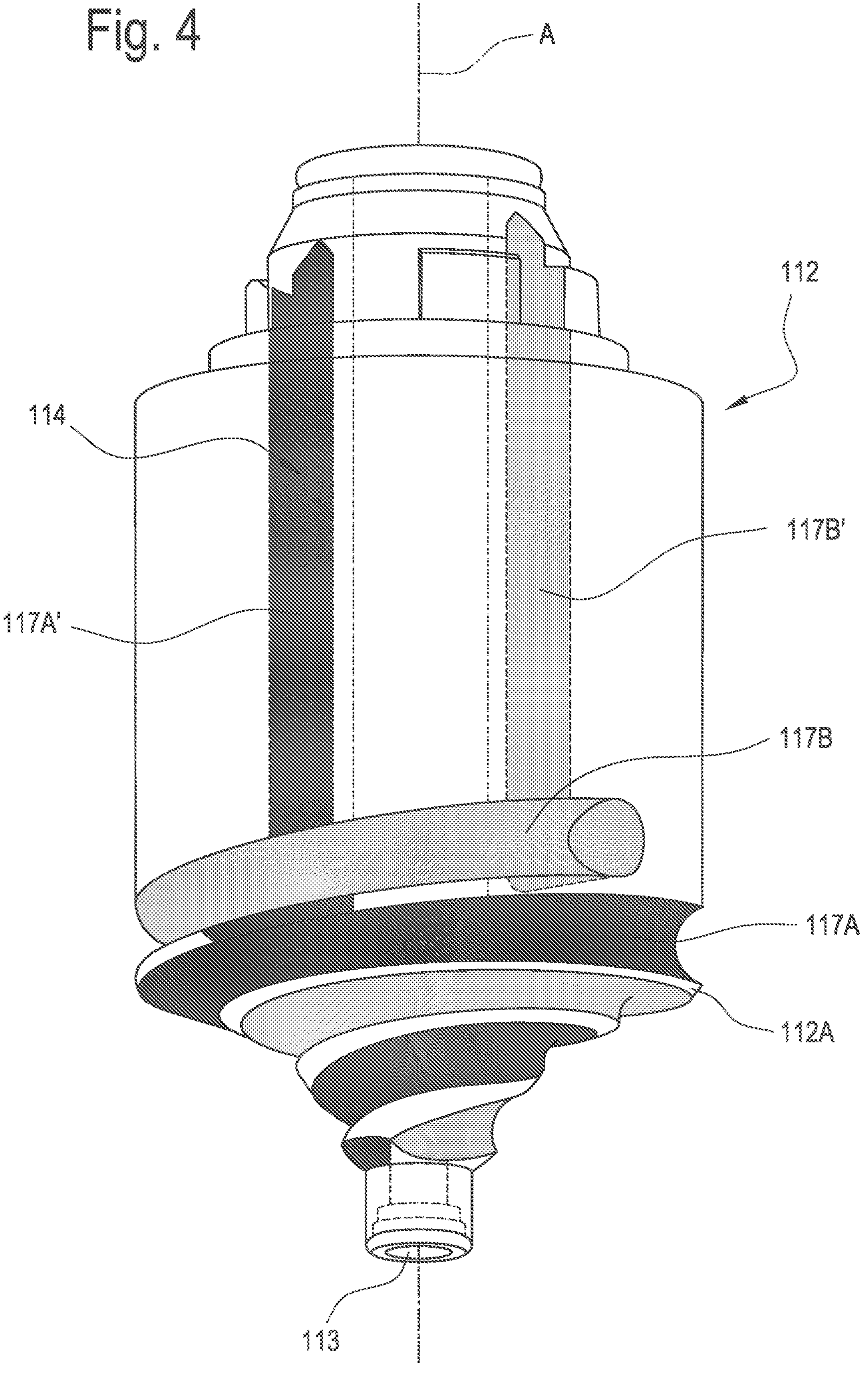
FIG. 4 illustrates the body of the male element of the mould of FIG. 1.
Figure 5:
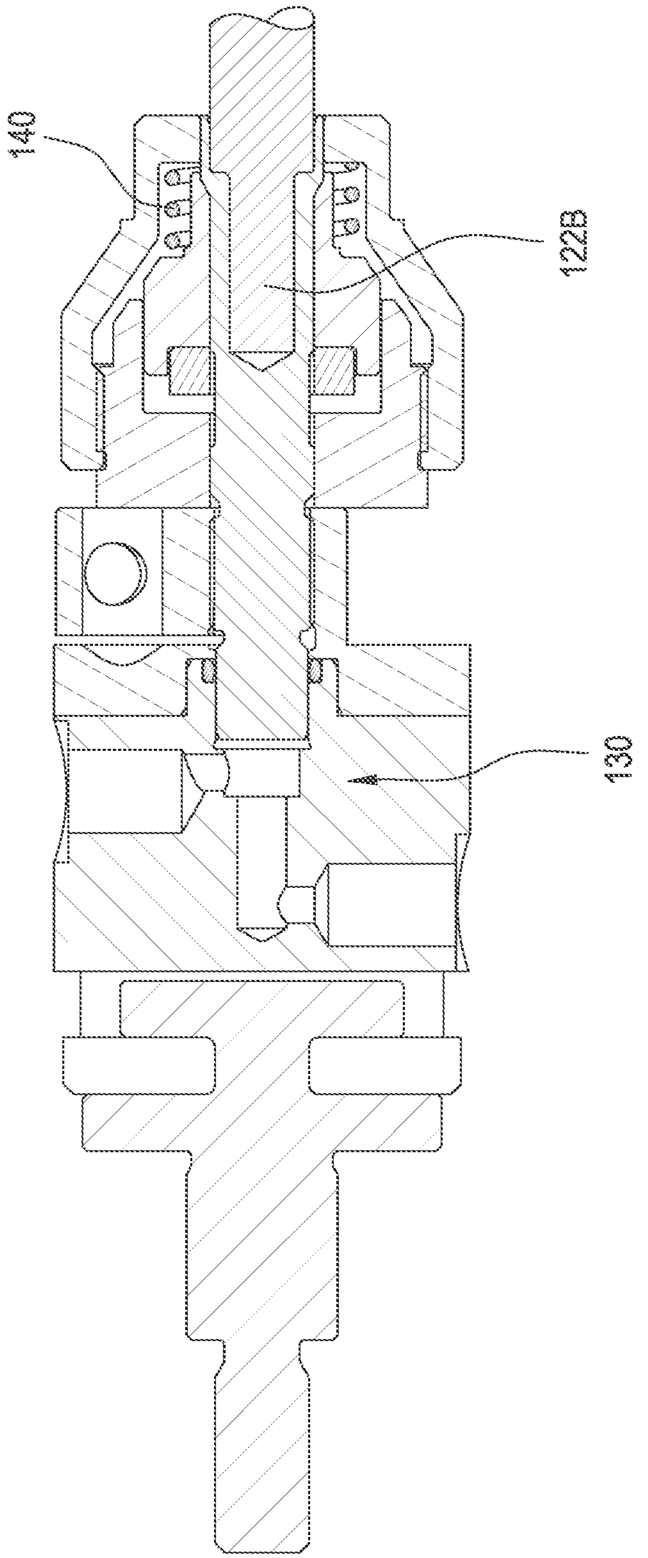
FIG. 5 illustrates an actuating unit for driving the stretching rod of the male element of the mould of FIG. 1.
Figures 6A, 6B, 6C:
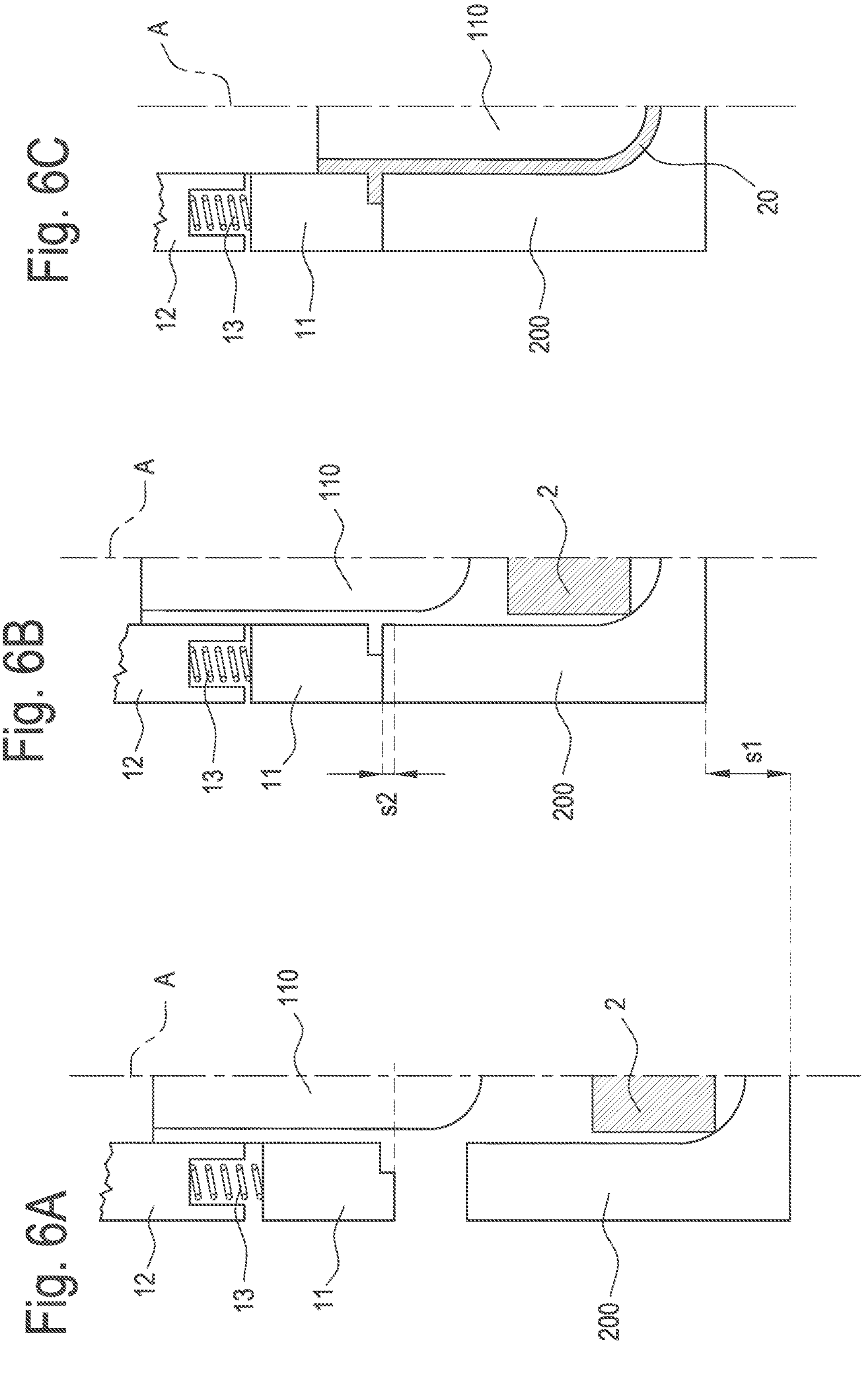
FIG. 6A illustrates the mould of FIG. 1 in an open, or dose receiving, configuration.
FIG. 6C illustrates the mould of FIG. 1 in a closed, or forming, configuration.
FIG. 6B illustrates the mould of FIG. 1 in a configuration intermediate between the configurations shown in FIGS. 6A and 6C.

With reference to the accompanying drawings, the numeral 10 denotes a mould.

The mould 10 comprises a male element 100 and a female element 200, movable between an open configuration, in which they are spaced apart, for receiving a dose 2, and a closed configuration, in which they are close together to delimit a forming cavity 20 for forming a parison from the dose 2.

The mould 10 also comprises a blow moulding cavity, not illustrated, associable with the male element 100 instead of the female element 200 to form a container from the parison.

The male element 100 comprises a die 110. The die 110 extends along a longitudinal axis to an end 110A. The die 110 juts from a remaining part of the male element 110 along the longitudinal axis A; thus, the die 110 forms a protrusion of the male element 100, configured to be inserted into the female element 200.

At its longitudinal end 110A, the die 110 has a socket 111, or recess, in it. Inside it, the die 110 has a longitudinal cavity 113, extending along the longitudinal axis A. The longitudinal cavity 113 communicates with—that is, opens onto—the socket 111.

The male element 100 also comprises a stretching rod 120 which is slidably inserted in the longitudinal cavity 113. The stretching rod 120 has an elongate body extending along the longitudinal axis A and a terminal portion 121 connected to one end of the elongate body. The terminal portion 121 is wider than the elongate body. Preferably, the longitudinal cross section of the terminal portion 121 becomes progressively wider away from the elongate body. The stretching rod 120 is movable between a retracted configuration, in which the elongate body is inserted in the longitudinal cavity 113 and the terminal portion 121 is inserted in the socket 111, and an extracted position, in which the elongate body is partly extracted from the longitudinal cavity 113 and the terminal portion 121 is extracted from the socket 111. It should be noted that the terminal portion 121 is larger in cross section than the longitudinal cavity 113 so it cannot enter the longitudinal cavity 113. Preferably, the terminal portion 121 has a flared shape.

The die 110 also includes a cooling circuit 114, configured to allow circulating a cooling fluid. The cooling circuit 114 comprises a delivery duct 117A to guide the fluid to the proximity of the end 110A of the die 110, and a return duct 117B to guide the fluid returning from the end 110A of the die 110. Preferably, the delivery duct 117A has the shape of a first helix wound around the longitudinal axis A and the return duct 117B has the shape of a second helix wound around the longitudinal axis A. The first helix and the second helix are wound round each other, so at least one coil of the first helix is interposed between two consecutive coils of the second helix and at least one coil of the second helix is interposed between two consecutive coils of the first helix. The helically shaped delivery duct 117A and return duct 117B are located in a zone of the die 110 whose cross section is converging towards the end 110A. The cooling circuit 114 also comprises a delivery manifold 117A', connected to the delivery duct 117A for bringing together the flow of cooling fluid, and a return manifold 117B', connected to the return duct 117B to extract the cooling fluid therefrom. The delivery manifold 117A' and the return manifold 117B' run parallel to the longitudinal axis A. Thus, the cooling fluid flows down the delivery manifold 117A' and along the delivery duct 117A to the proximity of the end 110A of the die 110, then along the return duct 117B and up the return manifold 117B'.

In a connection zone between the delivery duct 117A and the return duct 117B, in the proximity of the end 110A of the die 110, there is an O-ring surrounding the longitudinal cavity 113 to prevent the cooling fluid from leaking.

Preferably, the die 110 comprises a body 112; the die 110 also comprises a liner 116 fitted round the body 112. The delivery duct 117A and the return duct 117B are formed between the body 112 and the liner 116. More specifically, the body 112 is grooved to create hollows which, together with a corresponding inside surface portion of the liner 116, delimit a ducting system 117. The ducting system 117 defines the ducts 117A and 117B for the cooling fluid. The body 112 also has non-grooved zones defining support surface 112A on which the liner 116 is supported. Preferably, a support surface 112A is defined between each coil of the delivery duct 117A and the adjacent coil of the return duct 117B.

It should be noted that the stretching rod 120 is spaced from the wall of the body 112 defining the longitudinal cavity 113. Thus, there is a gap 115 between the stretching rod and the wall of the body 112 defining the longitudinal cavity 113. The gap 115 has a tubular shape around the stretching rod 120. In the embodiment illustrated, the gap 115 is wider in a zone far from the end 110A of the die 110 and less wide in a zone close to the end 110A of the die 110. The gap 115 is configured to channel the air flow used for blow moulding the parison. In effect, once it has been formed, the parison is blow moulded to make a container. The gap 115 runs along the longitudinal axis A as far as the socket 111, where it has an outlet 115A through which the blow moulding air is emitted.

When the stretching rod 120 is at the retracted position, the terminal portion 121 occludes the outlet 115A; when the stretching rod 120 is at the extracted position, the outlet 115A is open to allow the blow moulding air to flow out of the gap 115.

At the end of it opposite the terminal portion, the stretching rod 120 is connected to a diffuser rod 122. The diffuser rod 122, which also forms part of the male element 100, extends along the longitudinal axis A between a first end 122A, connected to the stretching rod 120, and a second end 122B, opposite to the first end 122A. The first end 122A defines a lead nut to which the threaded end of the stretching rod 120 is screwed. Thus, the diffuser rod 122 is integrally connected to the stretching rod 120. Preferably, the diffuser rod 122 is larger in cross section than the stretching rod 120.

The second end 122B of the diffuser rod 122 is connected to an actuating unit 130, configured to move the diffuser rod 122 and the stretching rod 120. More specifically, the actuating unit 130 moves the stretching rod 120 between the retracted position and the extracted position.

In an embodiment, the male element 100, or the mould 10, comprises a damping device 140, connected to the second end 122B of the diffuser rod 122. The damping device 140 may, for example, include a spring, wound around the second end 122B of the diffuser rod 122. The damping device 140 is configured to dampen a movement of the diffuser rod 122 corresponding to a movement of the stretching rod 120 from the extracted position to the retracted position. This prevents impact between the end 122B of the diffuser rod 122 and the actuating unit 130 from breaking the diffuser rod 122 and/or the stretching rod 120 and or the threaded connection between the diffuser rod 122 and the stretching rod 120.

In an embodiment, the male element 100 also comprises an abutment element 11, surrounding the die 110 and configured to come into abutment against the annular periphery of the female element 200 when the mould 10 closes—that is, in the forming configuration of the mould 10.

The male element 100 also comprises a support element 12 and an elastic element 13 (for example, a spring), where the abutment element 11 is connected to the support element 12 by the elastic element 13. When at rest, the elastic element 13 tends to keep the abutment element 11 spaced from the support element 12.

When the mould 10 closes, the female element 200 moves into contact with the abutment element 11, applying pressure thereon which causes it to move closer to the support element 12, thereby compressing the elastic element 13. Thus, a displacement s1 of the female element 200 towards the male element 100 produces a displacement s2 of the abutment element 11 towards the support element 12, where s2 is smaller than s1. That way, even if the stroke of the female element 200 is not precisely gauged, contact with the male element 100 is nevertheless ensured.

To prevent the abutment element 11 from moving away from the support element 12, causing the parison to come away from the die 110 when the female element 200 moves away from the male element 100 after the parison has been formed, the male element 100 is provided with a locking device which is configured to mechanically engage the abutment element 11. Thanks to the locking device, the abutment 11 remains stationary relative to the support element 12 and the spring of the elastic element 13 remains compressed even when the female element 200 moves away from the abutment element 11.

The following paragraphs, listed in alphanumeric order for reference, are non-limiting example modes of describing this invention.

A. A male element (100) of a mould (10) for the compression moulding of a parison from a previously prepared dose (2) of thermoplastic material, wherein the male element (100) is associable with a female element (200) of the mould (10) to delimit a forming cavity (20) intended for forming the parison, wherein the male element (100) comprises a die (110) extending along a longitudinal axis (A) and including a body (112).

A1. The male element according to paragraph A, comprising a passage for an air flow to blow mould the parison to form a container.

A1.1. The male element according to paragraph A1, wherein the die, inside it, has a longitudinal cavity (113), extending along the longitudinal axis (A) and, at one end of it, a socket (111) in communication with the longitudinal cavity (113), and wherein the male element comprises a stretching rod (120), slidably inserted in the longitudinal cavity (113) and including a terminal portion (121) at one end of it, the stretching rod (120) being movable relative to the die (110) between a retracted position, in which the terminal portion (121) is housed inside the socket (111) to contribute, together with the die (110), to delimiting the forming cavity (20), and an extracted position, in which the terminal portion (121) is extracted from the socket (111) so it stretches the parison.

A1.1.1. The male element according to paragraph A1.1, wherein the passage for the air flow includes a gap (115) formed by a portion of the longitudinal cavity (113), between an outside surface of the stretching rod (120) and an inside surface of the die (110) delimiting the longitudinal cavity (113).

A1.1.1.1. The male element according to paragraph A1.1.1, wherein the gap (115) extends up to the socket (111), where there is an outlet (115A) to allow the air flow to exit, wherein the terminal portion (121) of the stretching rod (120), at the retracted position, occludes the outlet (115A) to prevent the air from flowing out of the gap (115) into the forming cavity (20), and, at the extracted position, is spaced from the socket (111) so the outlet (115A) is open to allow the air to flow out of the air gap (115), wherein the gap (115) preferably has a tubular shape surrounding the stretching rod.

A1.2. The male element according to any of the paragraphs from A1.1 to A1.1.1.1, comprising:
- an actuating unit (130) configured to drive a movement of the stretching rod (120) from the extracted position to the retracted position and vice versa;
- a damping device (140), associated with the actuating unit (130) and configured to slow the movement of the stretching rod (120) from the extracted position to the retracted position.

A1.2.1. The male element according to paragraph A1.2, comprising a diffuser rod (122) extending between a first end (122A), connected to the stretching rod (120), preferably by a threaded coupling, and a second end (122B), opposite to the first end (122A), wherein the actuator unit (130) is connected to the second end (122B) of the diffuser rod (122) and is configured to move the diffuser rod (122) between a first position, corresponding to the extracted position of the stretching rod (120), and a second position, corresponding to the retracted position of the stretching rod (120);

wherein the damping device (140) is mounted at the second end (122B) of the diffuser rod (122) and is configured to slow the movement of the diffuser rod (122) from the first to the second position.

A1.2.1.1. The male element according to paragraph A1.2.1, wherein the damping device (140) includes a spring, mounted to the second end (122B) of the diffuser rod (122).

A2. The male element according to paragraph A or A1, further comprising an upper part, wherein the die (110) is retractile relative to the upper part so it can move between a retracted position where, together with the upper part, it contributes to delimiting the forming cavity (20), and an extracted position, where it is configured to stretch the parison.

A3. The male element according to any of the paragraphs from A to A2, wherein the die (110) inside it, includes a cooling circuit (114), configured to allow a cooling fluid to flow through it.

A3.1. The male element according to paragraph A3, wherein the cooling circuit includes a delivery duct for circulating the cooling fluid towards the end of the die and a return duct for circulating the cooling fluid returning from the end of the die, wherein the return duct is connected in series to the delivery duct.

A3.1.1. The male element according to paragraph A3.1, wherein the delivery duct (117A) has the shape of a first helix wound around the longitudinal axis (A) and the return duct (117B) has the shape of a second helix wound around the longitudinal axis (A), wherein at least one coil of the first helix is interposed, along the longitudinal axis (A), between a first and a second coil of the second helix.

A3.1.2. The male element according to paragraph A3.1 or A3.1.1, wherein the die (110) comprises a liner (116) fitted round the body (112) and having an outside surface, acting in conjunction with the female element (200) of the mould (10) to delimit the forming cavity (20), and an inside surface in contact with the outside surface of the body (112), wherein the cooling circuit comprises a ducting system (117) formed between the body (112) and the liner (116).

A3.1.2.1. The male element according to paragraph A3.1.2, wherein the outside surface of the body (112) is grooved, so as to create a hollow surface (112A) acting in conjunction with a corresponding portion of an inside surface of the liner (116) to delimit the ducting system (117).

A4. The male element according to any of the paragraphs from A to A3.1.2.1, comprising:

- an abutment element (11) configured to come into abutment against an annular periphery of the female element (200);
- a support element (12);
- an elastic element (13), connected between the abutment element (11) and the support element (12), wherein the abutment element (11) is movable relative to the support element (12) between a rest position, where the elastic element (13) keeps it spaced from the support element (12), and a working position, where it is in contact with the support element (12), wherein the abutment element (11) can be set to the working position by the effect of pressure applied thereon by the female element (200), wherein the mould (10) also comprises a locking device, configured to engage the abutment element (11) to keep it at the working position even when the female element no longer applies pressure on it.

A4.1. The male element according to paragraph A4, wherein the locking device is movable between a locking position, where it engages the abutment element, and a rest position, where it is disengaged from the abutment element.

B00. A mould (10) for the moulding of a parison from a predefined quantity of thermoplastic material, wherein the mould (10) comprises:

- a male element (100) according to any of the paragraphs from A to A4.1;
- a female element (200), associable with the male element (100) to delimit the forming cavity (20) that forms the parison from the dose (2);
- wherein the mould (10) has a forming configuration in which the male element (100) is associated with the female element (200) to form the parison in the forming cavity (20).

B01. A mould (10) according to the paragraph BOO, for the injection moulding of the parison.

B02. A mould (10), according to the paragraph BOO, for the compression moulding of the parison, wherein the a predefined quantity of thermoplastic material form a dose from a dose (2) of thermoplastic material (the dose being workable) B. A mould (10) for the compression moulding of a parison from a dose (2) of thermoplastic material, wherein the mould (10) comprises:

- a male element (100) according to any of the paragraphs from A to A4.1;
- a female element (200), associable with the male element (100) to delimit the forming cavity (20) that forms the parison from the dose (2);
- wherein the mould (10) has a forming configuration in which the male element (100) is associated with the female element (200) to form the parison in the forming cavity (20).

B1. The mould (10) according to paragraph B or BOO or B01 or B02, comprising a blow moulding cavity, associable with the male element (100) instead of the female element (200), to delimit the blow moulding cavity where a container is formed from the parison, wherein the mould has a stretching and blow moulding configuration in which the male element (100) is associated with the blow moulding cavity to stretch and blow mould the parison.

C. A method for the compression moulding and blow moulding of a parison, the method comprising the following steps:

- receiving a previously prepared dose (2) of thermoplastic material in a mould (10);
- forming the parison from the dose (2) in a forming cavity delimited by a male element (100) and a female element (200) of the mould (10), wherein the male element (100) comprises a die (110), extending along a longitudinal axis (A) and including a body (112);
- stretching and blow moulding the parison to form a container.

C1. The method according to paragraph C, comprising a step of cooling the die (110) by passing a cooling fluid through a cooling circuit (114) inside the die.

C2. The method according to paragraph C or C1, wherein the body, inside it, has a longitudinal cavity (113), extending along the longitudinal axis (A) and, at one end of it, a socket (111) in communication with the longitudinal cavity, and wherein the male element comprises a stretching rod (120), slidably inserted in the longitudinal cavity (113) and including a terminal portion at one end of it, wherein the method comprises a step of moving the stretching rod between a retracted position, in which the terminal portion (121) is housed inside the socket (111) to contribute, together with the die (110), to delimiting the forming cavity (20), and an extracted position, in which the terminal portion (121) is extracted from the socket (111) so it stretches the parison.

C2.1. The method according to paragraph C2, wherein blow moulding includes blowing an air flow into a passage of the male element (100) and wherein the passage for the air flow includes a gap (115) formed by a portion of the longitudinal cavity (113), between an outside surface of the stretching rod and an inside surface of the die delimiting the longitudinal cavity.

C2.2. The method according to paragraph C2 or C2.1, comprising a step of slowing the movement of the stretching rod from the extracted position to the retracted position with a damping device.

C3. The method according to any of the paragraphs from C to C2.2, wherein the male element comprises:

an abutment element (11) configured to come into abutment against an annular periphery of the female element (200);

a support element (12);

an elastic element (13), connected between the abutment element (11) and the support element (12), wherein the method comprises a step of moving the abutment element (11) relative to the support element (12) between a rest position, where the elastic element (13) keeps it spaced from the support element (12), and a working position, where it is in contact with the support element (12), wherein the abutment element (11) is set to the working position by the effect of pressure applied thereon by the female element (200) while the mould is being closed, and wherein the method includes locking the abutment element at the working position with a locking device which engages the abutment element so that while the mould is being opened, the abutment element remains at the working position even if the female element is not applying pressure on it.

The invention claimed is:

1. A male element of a mould for the compression moulding of a parison from a previously prepared dose of thermoplastic material, wherein the male element is associable with a female element of the mould to delimit a forming cavity intended for forming the parison, the male element comprising:

a die, extending along a longitudinal axis and including a body having an inside wall forming a longitudinal cavity extending along the longitudinal axis, and a socket in communication with the longitudinal cavity, the socket being located at one end of the body at a tip of the die; and a stretching rod, slidably inserted in the longitudinal cavity formed by the inside wall of the die and including a terminal portion at one end of the stretching rod, the stretching rod being movable relative to the die between a retracted position, in which the terminal portion is housed inside the socket to contribute, together with the die, to delimiting the forming cavity, and an extracted position, in which the terminal portion is extracted from the socket so it stretches the parison, wherein the inside wall of the die, defining the longitudinal cavity, and an outer portion of the stretching rod form a passage extending along the longitudinal axis to a terminal end of the inside wall in correspondence with the socket for an air flow to blow mould the parison to form a container, the passage for the air flow including a gap extending until a terminal end of the longitudinal cavity, in correspondence with the socket, the gap being interposed between the stretching rod and the body, wherein the socket defines, at the terminal end of the longitudinal cavity, an outlet for the passage of air, so that the socket defines an air exit, wherein, in the retracted position of the stretching rod, the terminal portion of the stretching rod blocks the outlet to prevent air flow from flowing from the gap to the forming cavity, and, in the extended position of the stretching rod, the terminal portion of the stretching rod is away from the socket, so that the outlet is open to allow the air flow to flow out of the gap, and wherein the die internally includes a cooling circuit, configured to allow a flow of a cooling fluid.

2. The male element according to claim 1, wherein the passage has a tubular shape surrounding the stretching rod.

3. The male element according to claim 1, comprising:

an actuating unit configured to drive a movement of the stretching rod from the extracted position to the retracted position and vice versa;

a damping device associated with the actuating unit and configured to slow the movement of the stretching rod from the extracted position to the retracted position.

4. The male element according to claim 3, comprising a diffuser rod extending between a first end, connected to the stretching rod, and a second end, opposite to the first end, wherein the actuator unit is connected to the second end of the diffuser rod and is configured to move the diffuser rod between a first position, corresponding to the extracted position of the stretching rod, and a second position, corresponding to the retracted position of the stretching rod;

wherein the damping device is mounted at the second end of the diffuser rod and is configured to slow the movement of the diffuser rod from the first to the second position.

5. The male element according to claim 4, wherein the damping device includes a spring mounted to the second end of the diffuser rod.

6. The male element according to claim 4, wherein the stretching rod is connected to the first end of the diffuser rod by a threaded coupling.

7. The male element according to claim 1, wherein the cooling circuit includes a delivery duct for circulating the cooling fluid towards the end of the die and a return duct for circulating the cooling fluid returning from the end of the die.

8. The male element according to claim 7, wherein the return duct is connected in series to the delivery duct and wherein the delivery duct has the shape of a first helix wound around the longitudinal axis and the return duct has the shape of a second helix wound around the longitudinal axis, wherein at least one coil of the first helix is interposed, along the longitudinal axis, between a first and a second coil of the second helix.

9. The male element according to claim 1, comprising:

an abutment element configured to come into abutment against an annular periphery of the female element;

a support element; and an elastic element, connected between the abutment element and the support element, wherein the abutment element is movable relative to the support element between a rest position, where the elastic element keeps it spaced from the support element, and a working position, where it is in contact with the support element, wherein the abutment element can be set to the working position by the effect of pressure applied thereon by the female element; and wherein the mould also comprises a locking device, configured to engage the abutment element to keep it at the working position even when the female element no longer applies pressure on it.

10. The male element according to claim 1, wherein the passage for the air flow and the cooling circuit are separated conduits, whereby the passage for an air flow is separated with respect to the cooling circuit.

11. The male element according to claim 10, wherein the body has an external surface, opposite the internal surface, the cooling circuit being in contact with the external surface of the body, wherein the passage for the air flow is in contact with the internal surface of the body.

12. The male element according to claim 1, wherein the die comprises a liner fitted round the body and wherein the cooling circuit is formed between the body and the liner.

13. The male element according to claim 12, wherein an outside surface of the body facing towards the liner is grooved so as to create a hollow surface cooperating with a corresponding portion of an inside surface of the liner to delimit ducts for the cooling fluid, and wherein the outside surface of the body provides contact zones where the body is in contact with the liner.

14. A mould for the compression moulding of a parison from a dose of thermoplastic material and for blow moulding the parison, wherein the mould comprises:

a male element according to claim 1;

a female element associable with the male element to delimit the forming cavity that forms the parison from the dose; and a blow moulding cavity, associable with the male element instead of the female element to delimit a blow moulding cavity intended for the forming of a container from the parison;

wherein the mould has a forming configuration in which the male element is associated with the female element and the stretching rod is at the retracted position, to form the parison in the forming cavity, and a stretching and blow moulding configuration in which the male element is associated with the blow moulding cavity and the stretching rod is at the extracted position.

15. The mould according to claim 14, also having a configuration for receiving the dose in which the female element is spaced from the male element to receive the dose.

16. The mould according to claim 14, wherein the die of the male element is positioned at the same vertical height in the forming configuration as it is in the stretching and blow moulding configuration.

* * * * *